United States Patent
Varonis

(10) Patent No.: US 7,780,357 B2
(45) Date of Patent: Aug. 24, 2010

(54) BEARING WITH CAGE-MOUNTED SENSORS

(75) Inventor: Orestes J. Varonis, North Canton, OH (US)

(73) Assignee: The Timken Company, Canton, OH (US)

( * ) Notice: Subject to any disclaimer, the term of this patent is extended or adjusted under 35 U.S.C. 154(b) by 485 days.

(21) Appl. No.: 11/815,183

(22) PCT Filed: Jan. 30, 2006

(86) PCT No.: PCT/US2006/003043

§ 371 (c)(1),
(2), (4) Date: Jul. 31, 2007

(87) PCT Pub. No.: WO2006/083736

PCT Pub. Date: Aug. 10, 2006

(65) Prior Publication Data

US 2008/0159674 A1    Jul. 3, 2008

Related U.S. Application Data

(60) Provisional application No. 60/649,298, filed on Feb. 1, 2005.

(51) Int. Cl.
*F16C 32/04* (2006.01)
*G01P 3/66* (2006.01)

(52) U.S. Cl. .................. 384/448; 384/445; 73/862.55; 324/178

(58) Field of Classification Search .............. 384/448, 384/459, 537, 48, 580, 584, 589; 324/173–174, 324/207.13, 207.2, 207.25, 178; 73/862.55
See application file for complete search history.

(56) References Cited

U.S. PATENT DOCUMENTS 4,175,430 A * 11/1979 Morrison et al. ......... 73/862.55

(Continued)

FOREIGN PATENT DOCUMENTS

EP        2190619        7/1990

(Continued)

OTHER PUBLICATIONS

Joshi, et al, *Bearing Cage Temperature Measurement Using Radio Telemetry..*, Proceeding Institutions of Medical Engineers, pp. 471-481, © IMechE (2001) vol. 215 Part J, (12 pgs).

(Continued)

*Primary Examiner*—Marcus Charles
(74) *Attorney, Agent, or Firm*—Polster Lieder Woodruff & Lucchesi, LC

(57) ABSTRACT

An antifriction bearing (A) for accommodating rotation about an axis (X) comprises an inner race (2) having a raceway (12), an outer race (4) having a raceway (22), rolling elements (6) positioned between the inner and outer races (2, 4) and contacting the raceways (12, 22) of those races (2, 4) so that when relative rotation occurs between the races (2, 4) the rolling elements (6) roll along the raceways (12, 22), a cage (8) positioned between the inner and outer races (2, 4) and having pockets (40) in which the rolling elements (6) are received with the cage (8) being rotatable between the races (2, 4) as the rolling elements (6) roll along the raceways (12, 22), the outer race (4) having a power transmitting coil (50) and a receiver (60), the cage (8) having a power receiving coil (52), a sensing unit (D) for sensing a condition of the bearing (A), and a transmitter (54) for sending a signal indicative of the sensed condition of the bearing (A) to the receiver (60).

25 Claims, 6 Drawing Sheets

U.S. PATENT DOCUMENTS

| | | | |
|---|---|---|---|
| 5,017,866 A * | 5/1991 | Santos et al. | 384/448 |
| 5,226,736 A | 7/1993 | Becker et al. | |
| 5,898,388 A | 4/1999 | Hofmann et al. | |
| 6,161,962 A * | 12/2000 | French et al. | 384/459 |
| 6,501,382 B1 * | 12/2002 | Rehfus et al. | 384/459 |
| 6,535,135 B1 | 3/2003 | French et al. | |
| 6,971,799 B2 * | 12/2005 | Sato et al. | 384/448 |
| 2001/0003548 A1 * | 6/2001 | Straub et al. | 384/580 |
| 2006/0245677 A1 * | 11/2006 | Kenworthy et al. | 384/448 |

FOREIGN PATENT DOCUMENTS

| | | |
|---|---|---|
| EP | 0637734 | 6/1994 |
| EP | 1593948 A1 * | 11/2005 |
| GB | 2382142 | 11/2001 |
| WO | 03102524 | 5/2003 |
| WO | WO 2004104545 A1 * | 12/2004 |

OTHER PUBLICATIONS

Nickel, et al, *In Situ Tribocomponent Temperature Measurement Using a Radio Telemeter*, Tribology Transactions, vol. 40, pp. 514-520 (1997), Purdue University (7 pgs.).

*SITIS Archives—Topic Details, High Performance Cage Sensors for Rolling Element Bearing Health* Monitoring, SBIR/STTR Interactive Topic Information System (SITIS); (SBIR 2006.1-AF06-094) (2006), (2 pgs.) available at http://www.dodsbir.net/SITIS/archives_display_topic.asp?Bookmark=28686.

* cited by examiner

1

BEARING WITH CAGE-MOUNTED SENSORS

CROSS-REFERENCE TO RELATED APPLICATIONS

This application is a United States national phase under 35 USC §371 of PCT/US2006/003043, filed Jan. 30, 2006, which claims the benefit of U.S. Provisional Application No. 60/649,298, filed on Feb. 1, 2005, and entitled BEARING WITH CAGE-MOUNTED SENSORS. The disclosure of the above application is incorporated herein by reference.

TECHNICAL FIELD

This invention relates in general to antifriction bearings and, more particularly, to an antifriction bearing having cage-mounted sensors to monitor one or more conditions within the bearing.

BACKGROUND ART

Where shafts or other components of machinery rotate, one usually finds antifriction bearings. These bearings minimize friction by interposing small rolling elements between the rotatable machine component and the stationary component in which or on which the rotatable component revolves. Typically, the rolling elements move along raceways that are on inner and outer races with one fitted to the rotatable component and the other to the stationary component. The rolling elements may take the form of simple balls, cylindrical rollers, tapered rollers or so-called spherical rollers.

The raceways and the rolling elements remain obscured by the outer race and often an antifriction bearing lies deeply within a machine. Moreover, seals often close the ends of antifriction bearing. Thus, one does not easily inspect an antifriction bearing to determine conditions within its interior.

Apart from conditions that might reveal themselves with disassembly of a bearing, other conditions under which a bearing operates are not discernible from visual inspections. For example, one cannot by visual observations determine the load applied to a bearing or the torque transmitted through the shaft or other component on which the bearing is mounted. Likewise, the temperature at which a bearing operates does not reveal itself to visual observations, but an elevation in temperature certainly signals the onset of problems, and an increase in temperature owing to a lack of lubrication will first manifest itself along the raceways and other critical surfaces.

The physical condition of an antifriction bearing is best determined from within the interior of the bearing itself and the same holds true with regard to the conditions under which a bearing operates. However, extracting information about such conditions has proven to be difficult. Not only are the interiors of antifriction bearings generally inaccessible, but also, the rolling elements, which revolve within them, interfere with instrumentation designed to monitor the interiors of such bearings.

SUMMARY OF THE INVENTION

The present invention resides in an antifriction bearing having inner and outer races and rolling elements that roll along raceways on the races. In addition, the bearing has a cage that is located between the races where it is interlocked with the rollers, so that the cage revolves between the races as the rollers roll along the raceways. The cage carries a sensing unit for detecting an operating condition of the bearing and the sensing unit produces a signal that reflects or is indicative of the operating condition. The cage also carries a transmitter that is connected to the sensing unit and broadcasts at radio frequency a signal that reflects or is indicative of the operating condition.

Electrical power to operate the transmitter and the sensing unit may be inductively transferred from a power transmitter coil located opposite the cage to a power-receiving coil on the cage.

BEST MODE FOR CARRYING OUT THE INVENTION

Figure 1:
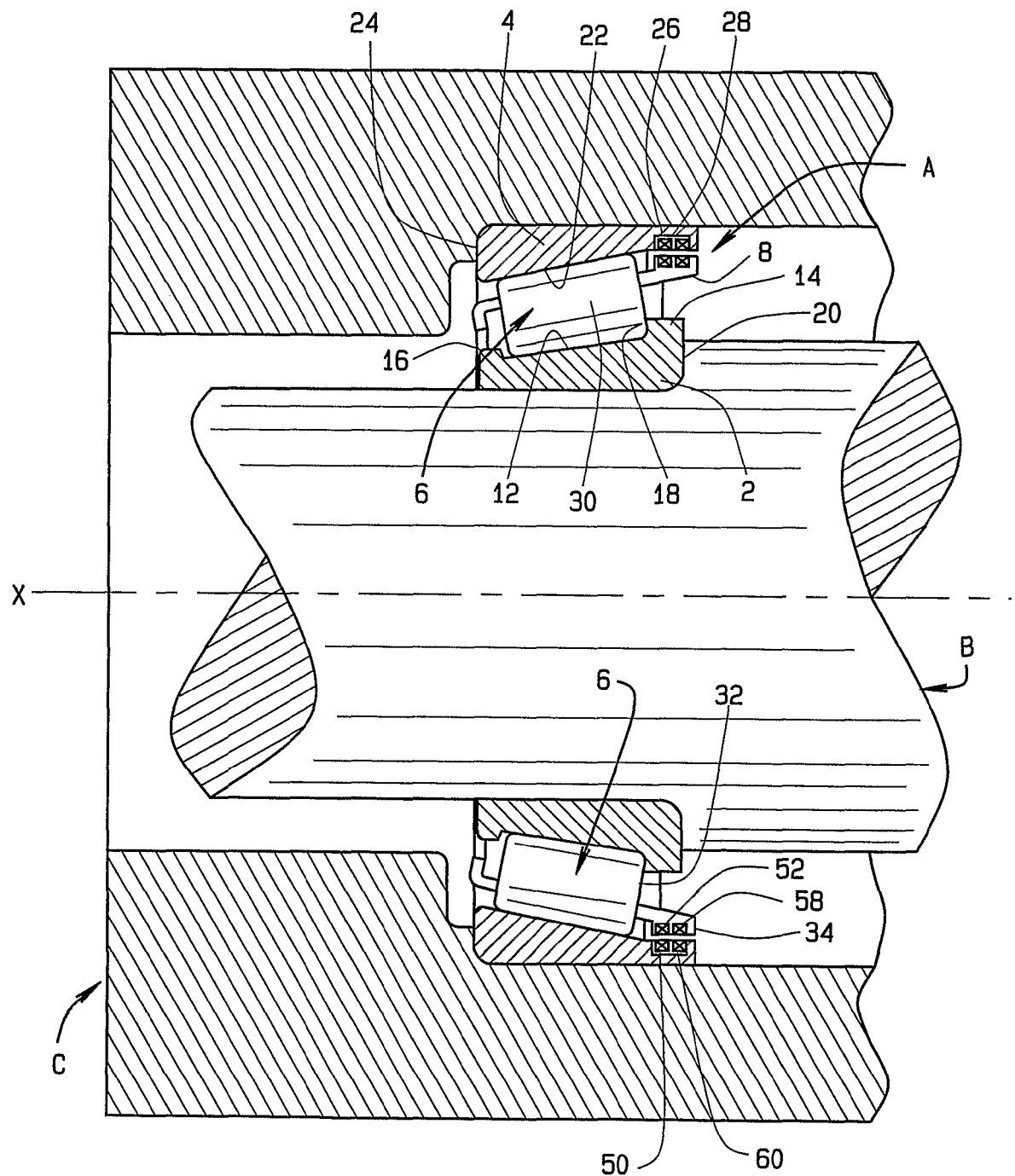
FIG. 1 is a longitudinal sectional view of an antifriction bearing in the form of a tapered roller bearing constructed in accordance with and embodying the present invention, with the bearing being located around a shaft and within a housing.

Referring now to the drawings and in particular to FIG. 1, an antifriction bearing in the form of a tapered roller bearing A supports a shaft B within a housing C and enables the shaft B to rotate within the housing C or the housing C to rotate around the shaft B, in either event about an axis X which is the axis of the bearing A. During the rotation, the bearing A produces signals, which reflect or are indicative of conditions within its interior. The conditions are generally transient, and exist only during the operation of the bearing A.

Moreover, they are best determined from the interior of the bearing A itself and in some instances can only be derived from the bearing interior. Typical conditions are load, torque, temperature, and angular velocity.

The bearing A includes an inner race in the form of a cone 2 which fits around the shaft B, an outer race in the form of a cup 4 which fits into the housing C, and rolling elements in the form of tapered rollers 6 arranged in a circular row between cone 2 and cup 4. In addition, the bearing A has a cage 8 which is located between the cone 2 and cup 4 where it is interlocked with the rollers 6. All are organized about the axis X. The cage 8 separates the rollers 6 and maintains the proper spacing between them. The cage 8 further holds the rollers 6 around the cone 2 when the cone 2 is withdrawn from the cup 4.

The cone 2 has a tapered raceway 12, which is presented outwardly away from the axis X. At its ends the cone 2 has two ribs, a thrust rib 14 and a retaining rib 16. The thrust rib 14 has a rib face 18 that lies along the large end of the raceway 12, but is oriented at a substantial angle with respect to it. The opposite side of the thrust rib 14 lies along a back face 20. The retaining rib 16 lies along the small end of the raceway 12.

The cup 4 has a tapered raceway 22, which is presented inwardly toward the raceway 12 of the cone 2. The small end of the raceway 22 runs out to a back face 24 which is squared off with respect to the axis X. The cup 4 continues beyond the large end of its raceway 22 as a cup extension 26 having an annular groove 28, which opens inwardly toward the axis X, and generally surrounds thrust rib 14 on the cone 2.

Each roller 6 has a tapered side face 30 and a slightly spherical end face 32 at the large end of the side face 30. The side faces 30 of the rollers 6 bear against the raceways 12 and 22 of the cone 2 and cup 4, respectively, there being generally line contact at these contacting surfaces. The end faces 32, on the other hand, bear against the rib face 18 of the thrust rib 14. Indeed, the rib 14 prevents the rollers 6 from running up the raceways 12 and 22 and being expelled from the space between the cone 2 and cup 4. The rollers 6 are on apex, meaning that when the rollers 6 are seated against the raceways 12 and 22 and against the rib face 18, the conical envelopes formed by their side faces 30 have their apices at a common point along the axis X.

Figure 5:
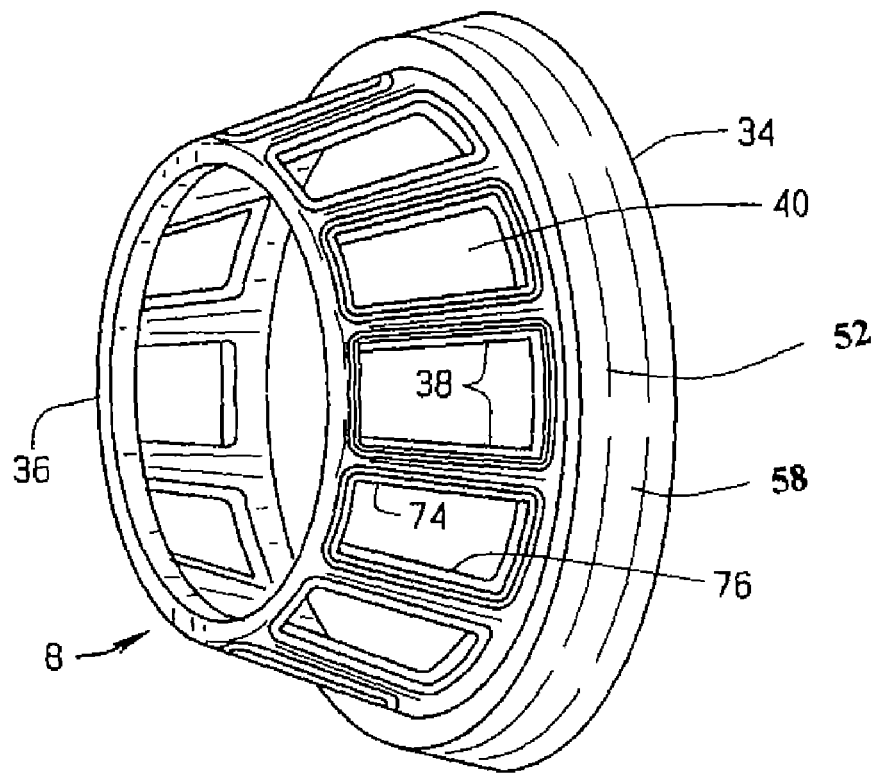
FIG. 5 is a perspective view of a cage having a sensing unit designed to ascertain roller loads.
Figure 6:
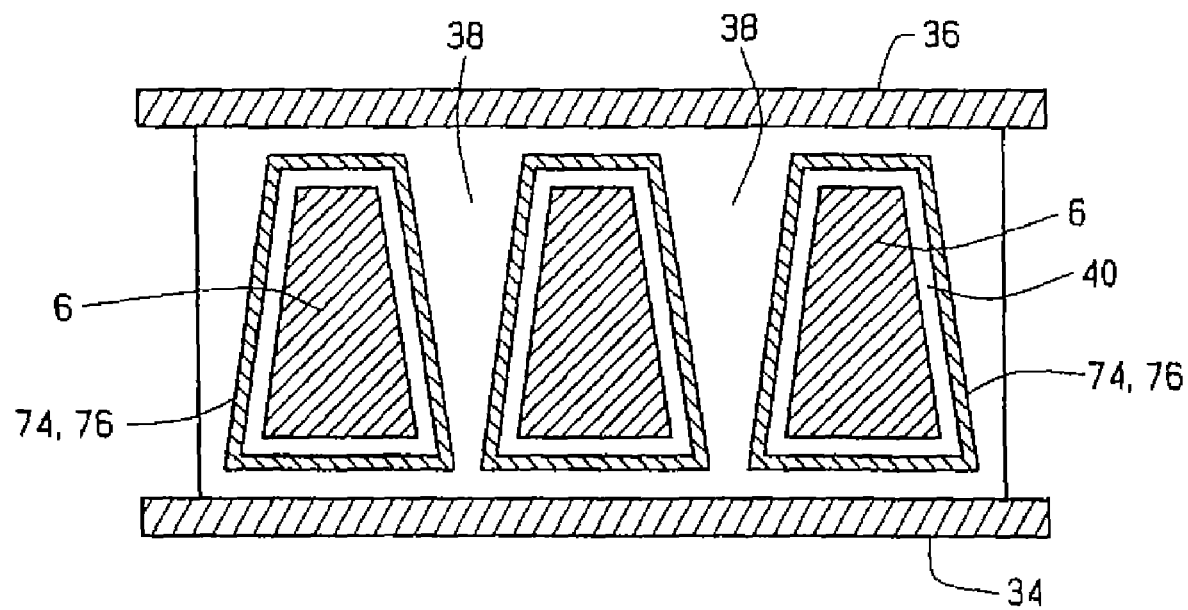
FIG. 6 is a schematic view of the cage of FIG. 5 provided with a coil for detecting eddy current in the rollers.
Figure 7:
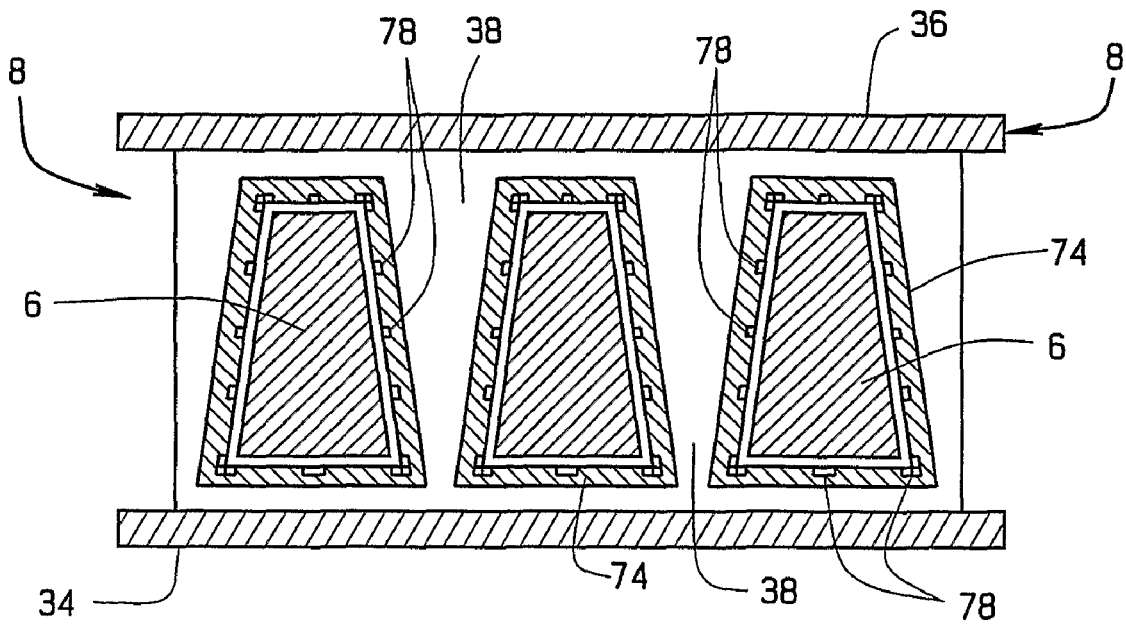
FIG. 7 is a schematic view of the cage of FIG. 5 provided with probes for detecting eddy currents in the rollers.
Figure 8:
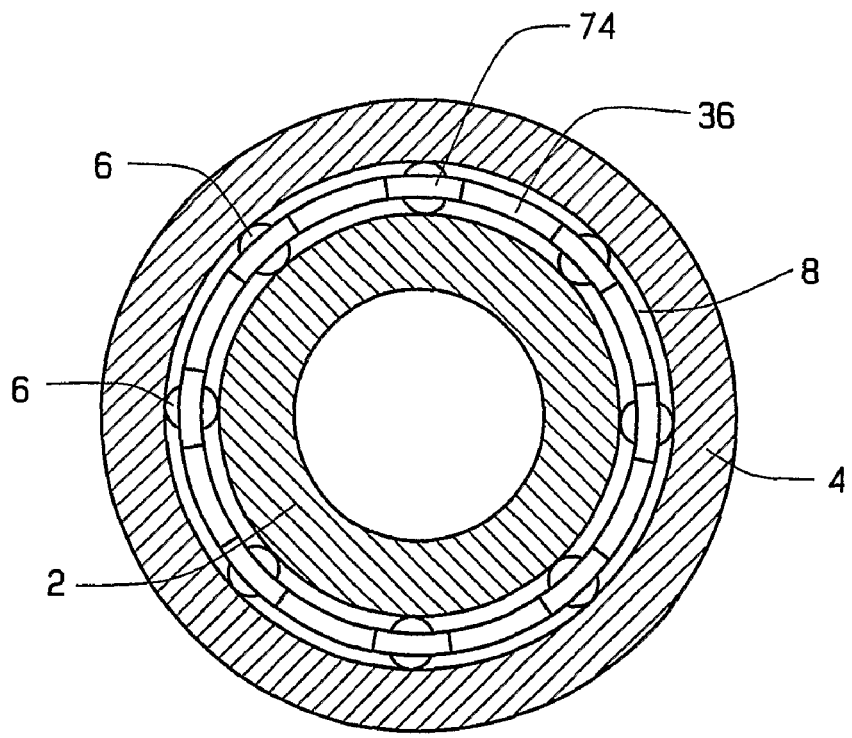
FIG. 8 is a transverse sectional view of the bearing fitted with a sensing unit for ascertaining roller loads.

The cage 8 likewise revolves between the raceway 12 and 22 of the cone 2 and cup 4, respectively, where it fits around the tapered rollers 6 to maintain the proper spacing between the rollers 6. It is molded from a polymer or otherwise formed from a nonmagnetic material. With reference now to both FIGS. 1 and 5, the cage 8 includes a large end ring 34 which extends across the large ends of the rollers 6, a small end ring 36 which extends across the small ends of the rollers 6, and bridges 38 which extend between and connect the large and small end rings 34 and 36. The bridges 38 pass between adjacent rollers 6 and maintain the proper spacing between those rollers 6. Together, with the end rings 34 and 36, they create roller pockets 40 within the cage 8, and those pockets 40 receive the rollers 6 thus interlocking the cage 8 with the set of rollers 6. The pockets 40 are slightly smaller than the rollers 6, so the cage 8 in effect rides on the rollers 6. While the rollers 6 protrude through the pockets 40 to contact the raceway 22 of the cup 4, they cannot pass completely through the pockets 40. Hence, the cage 8 will hold the rollers 6 around the cone 2 when the cone 2 and rollers 6 are withdrawn from the cup 4. The large end ring 34 rotates within the cup extension 26.

Figure 2:
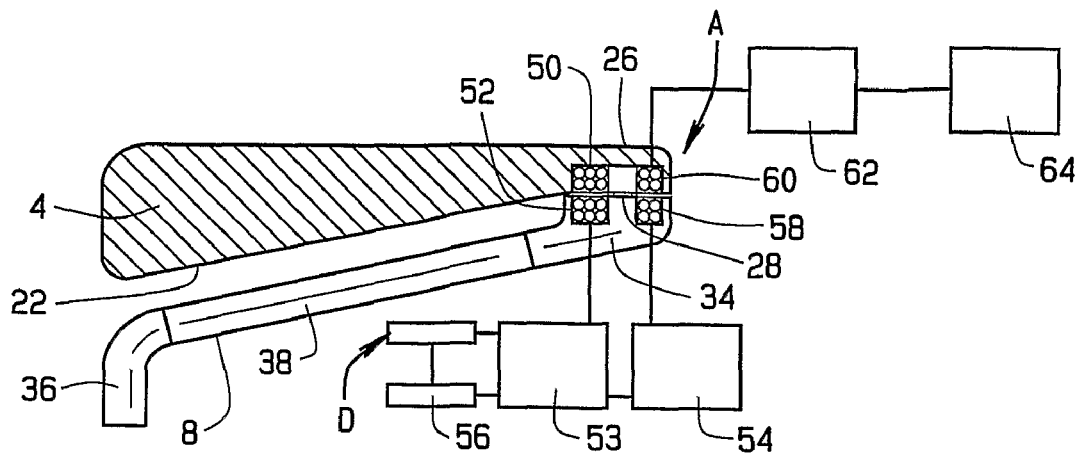
FIG. 2 is a fragmentation sectional view of the cup and cage of the bearing and further showing electrical components schematically.

Referring now to FIG. 2, the annular groove 28 in the extension 26 of the cup 4 contains a power-transmitting coil 50 having windings that extend circumferentially. The annular large end ring 34 of the cage 8 contains a power-receiving coil 52 that likewise has windings that extend circumferentially. An air gap exists between the innermost turns of the power transmitting coil 50 and the outermost turns of the power-receiving coil 52, and that air gap should measure no more than about 0.025 inches. When the power-transmitting coil 50 is placed across a source of alternating current, it produces a fluctuating magnetic flux, which cuts across the power-receiving coil 52 in the cage 8. That flux induces an alternating current in the power-receiving coil 52 when an electrical load is placed on the coil 52.

The cage also carries a rectifier 53, a sensing unit D, a processor 56, a transmitter 54, and a transmitting antenna 58. The sensing unit D detects operating conditions of the bearing A and produces signals, which reflect or are indicative of those operating conditions. Some sensing units D require alternating current, and they derive that current from the power-receiving coil 52. Other sensing units D require direct current, and they derive it from the rectifier 53, which is connected to the coil 52. Then again some sensing units D require both alternating and direct current. The rectifier 53 also generates DC power for the processor 56 and the radio transmitter 54.

The signals produced by the sensing units D pass to the processor 56 which routes the processed signals to the radio transmitter 54. Here the processed signals are converted to radio frequency (RF) signals, which are broadcast from the data-transmitting antenna 58 with the antenna 58 being in the form of windings located in the large end ring 34 of the cage 8. The annular groove 28 within the cup extension 26 contains a data-receiving antenna 60, which takes the form of windings located opposite and around the data-transmitting antenna 58. Being tuned to the data transmitting antenna 58 of the cage 8, the receiving antenna 60 intercepts the RF signal and delivers the signal to a receiver 62 which in turn routes it to another processor 64 where the signals are analyzed.

Figure 3:
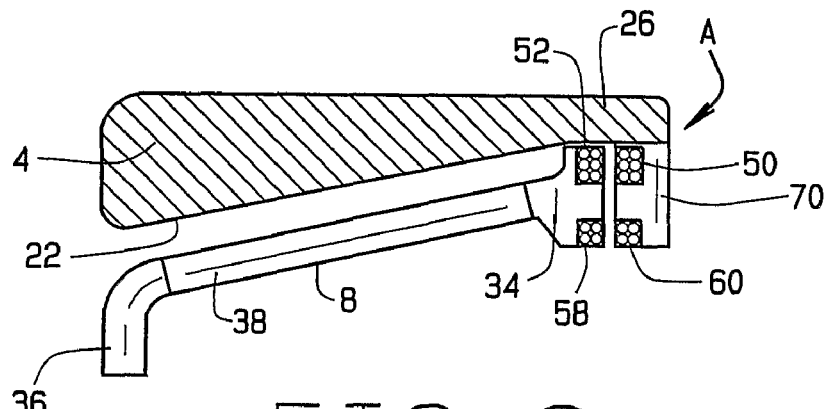
FIG. 3 is a fragmentary sectional view of a modified cup and cage.

FIG. 3 depicts a slightly modified form of the bearing A that has its power coils 50 and 52 and its antennas 58 and 60 spaced axially across an air gap instead of radially. In this form, the cup extension 26 at the large end of the cup raceway 22 is cylindrical and is without the groove 28. It receives an end ring 70, which contains the power transmitting coil 50 and the receiving antenna 60, one located radially outwardly from the other. The end ring 70 may also cooperate with the thrust rib 14 on the cone 2 to establish a dynamic fluid barrier along the rib 14. Indeed, where the cup 4 rotates and the cone 2 remains stationary, the ring 70 should be fitted to the thrust rib 14 of the cone 2 and establish a dynamic fluid barrier with the cup extension 26. In any event, the ring 70, in addition to serving as a carrier for the coil 50 and antenna 60, may further serve as a seal between the extension 26 on the cup 4 and the thrust rib 14 on the cone 2.

Furthermore, the large end ring 34 on the cage 8 for the bearing A in its modified form is enlarged radially, instead of axially, and contains the power receiving coil 52 and the transmitting antenna 58, one around the other. The power receiving coil 52 is located opposite the power transmitting coil 50 in the ring 70, while the transmitting antenna 58 is located opposite the receiving antenna 60.

The sensing unit D may take any of several forms depending on the condition that the sensing unit D is designed to detect. Among those conditions that may be detected are the load transmitted through the bearing A, the torque exerted on either the cone 2 or the cup 4, the temperature within the interior of the bearing A, and the angular velocity of the cone 2 or cup 4.

Load Monitoring

Figure 4:
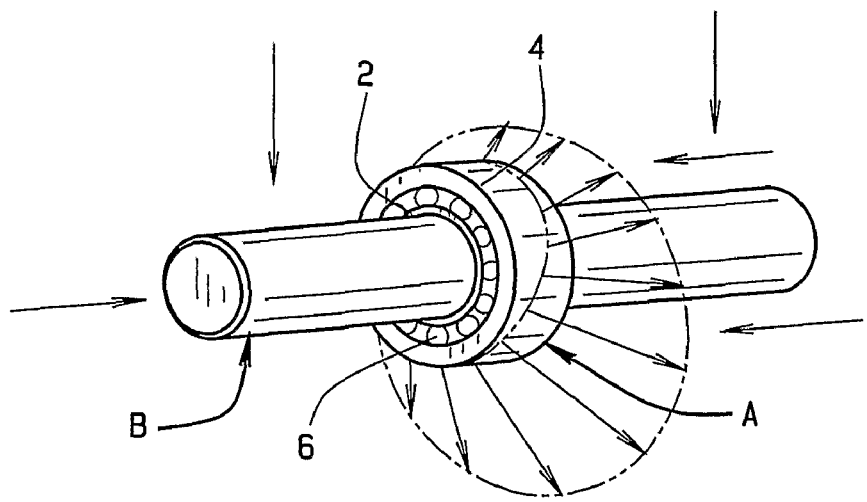
FIG. 4 is a perspective view of the bearing depicting graphically the distribution of the load transferred through it as a consequence of radial and thrust loading.

With reference now to FIG. 4, the bearing A has the capacity to transmit both radial and thrust loads between the shaft B and the housing C. The forces representing these loads pass through the cone 2 and the cup 4 and likewise through the rollers 6. A pure radial load will transfer through the rollers 6 within a 180° arc, assuming that the bearing A is set to a condition of zero end play, and will transfer through rollers 6 occupying a lesser arc if the bearing A is in end play. If the bearing A carries only a thrust load, all of the rollers 6 transfer the thrust load between the cone 2 and cup 4 and share the load equally.

The thrust load may derive from the bearing A having been set with preload. Typically the bearing A will be set with preload and will further carry a radial load and perhaps an additional axial load as well. As a consequence all of the rollers 6 at any time will transfer loads between the cone 2 and cup 4, some more so than others. Thus, the rollers 6 as they roll between the raceways 12 and 22 of the cone 2 and cup 4, respectively, exist in a state of compression, that is to say, they are compressed between the raceways 12 and 22, and the amount of compression within any roller 6 depends on its location with respect to the radial load.

The rollers 6 are formed from bearing steel, which is a ferromagnetic substance. The magnetic permeability and the electrical conductivity of any ferromagnetic material depends on its alloy content, its heat treatment history, and also the mechanical stress to which it is subjected. Within the bearing A, the alloy content and the heat treatment for the rollers 6 do not change, but the stress within each roller 6 does as it revolves between the cone 2 and cup 4. The sensing unit D may be configured to monitor the stress.

To this end, the sensing unit D configured to monitor the stress, as shown in FIGS. 5-8, includes excitation coils 74 that are placed across the power receiving coil 52 and conduct the alternating current that is induced in the coil 52, there being a separate excitation coil 74 for each roller 6. Indeed, each coil 74 surrounds the roller 6 to which it is dedicated. It contains several turns which are embedded in the two bridges 38 at the side of each pocket 40 for the roller 6 and are likewise embedded in the portions of the end rings 34 and 36 at the ends of the pocket 40 thus completely encircling the pocket 40. The alternating current in the excitation coil 74 produces an alternating magnetic field that passes through the roller 6 around which the coil 74 extends. That magnetic field induces eddy currents in the roller 6. The eddy currents in turn produce their own magnetic field, which interacts with the alternating magnetic field produced by the coil 74.

The magnetic permeability and electrical conductivity of any roller 6 varies with stress that exists within the roller 6 as a consequence of a load transmitted through it. The stress is proportional to the load on the roller 6. In addition to the excitation coil 74, the sensing unit D includes a detector for each roller 6, and that detector senses the eddy currents in the roller 6 to which it is dedicated or more accurately the resulting magnetic field produced by the interaction of the magnetic fields created by the excitation coil 74 and the eddy currents. The detector for a roller 6 may take the form of a detection coil 76 (FIGS. 5 and 6) that surrounds the pocket 40 for the roller 6 or it may take the form of several probes 78 (FIG. 7) located on the cage 8 along the edge of the pocket 40.

When the detection coil 76 serves as the detector (FIGS. 5 and 6), it has turns that likewise extend through the bridges 38 at the sides of the pocket 40 in which the roller 6 is located and also through the regions of the end rings 34 and 36 at the ends of the pocket 40. The turns of the detection coil 76 for a roller 6, like the turns of the excitation coil 74 for that roller 6, are embedded within the cage 8 where they encircle the roller 6. The detection coil 76 senses eddy currents throughout the roller 6 and, as a consequence, its response is proportional to average stress in the roller 6. This stress derives from both radial and axial loads transmitted through the roller 6, but the response of the detection coil 76 does not distinguish. The coil 76 generates relatively little noise. Being on the cage 8 and close to the roller 6 to which it is dedicated, each detection coil 76 senses only stresses in the roller 6 to which it is dedicated and not stresses along the raceways 12 and 22 of the cone 2 and cup 4.

The detection coil 76 and the excitation coil 74 may be embodied in a single coil that is embedded in the cage 8 around the pocket 40 for the roller 6 to which that united coil is dedicated.

Where the detector for a roller 6 takes the form of probes 78 (FIG. 7) those probes 78 are embedded in the cage 8 around the pocket 40 for that roller 6. As such, they may be, and usually are, in the bridges 38 along the sides of that pocket 40 and also in the end rings 34 and 36 at the ends of the pocket 40.

They sense localized eddy currents, and hence localized stresses, not average stresses, as does the detector coil 76. Any of a variety of probe-type detectors for eddy currents will suffice including magnetic flux probes, Hall-voltage probes, magnetoresistive probes and giant magnetoresistive probes. Since the probes 78 around any roller 6 detect only localized stresses, they can be monitored separately. However, the probes 78 for any roller 6 are normally connected in series.

When the coils 76 serve to detect the eddy currents in the rollers 6, they are organized into pairs; with each pair consisting of detection coils 76 for rollers 6 located 180° apart on the cage 8. The signals produced by the detection coils 76 of a pair are subtracted, and this has the effect of canceling the eddy current responses that reflect material properties, and leaves only responses that reflect loading. Where the eddy currents in each roller 6 are detected with series-connected probes 78, the signals from probes 78 at equivalent locations for roller 6 located 180° apart are subtracted. The subtraction occurs at the processor 56 (FIG. 2) to which the detection coils 76 or the series-connected probes 78 are connected.

The excitation coils 74 are electrically separated from the detection coils 76, and likewise when used with detection probes 78, are connected in series across the power-receiving coil 52.

Torque Monitoring

When the shaft B rotates under a load, torsional stresses develop within it. If the cone 2 is fitted to the shaft B with an interference fit, torsional stresses develop within the cone 2 as well. These stresses, which are non-uniform in character, manifest themselves as variations in the electrical conductivity and magnetic permeability of the cone 2, variations which exist at the raceway 12 of the cone 2.

Figure 9:
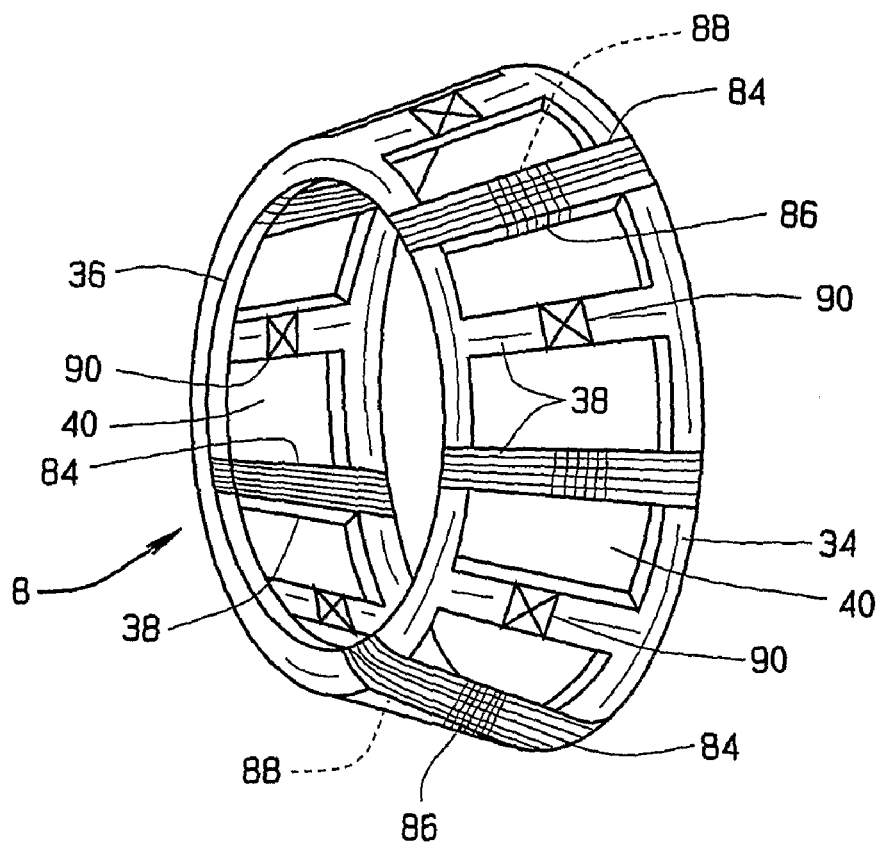
FIG. 9 is a perspective view of a cage having a sensing unit designed to ascertain torque.

In order to detect such variations and likewise variation in the torque to which the cone 2 is subjected, the sensing unit D, as shown in FIG. 9, includes a magnetic flux generator 84 located along alternating bridges 38 of the cage 8, that is to say, along every other bridge 38. The generator 84 may assume several forms, as will be discussed more fully herein.

In one form, the generator 84 has a coil 86 at the cage bridge 38 along which the generator 84 is located, and the turns of that coil 86 passes over the inside and outside surfaces of the bridge 38 in planes normal to bridge length.

The coil 86 is placed across the power-receiving coil 52, so that alternating current induced in the power-receiving coil 52 flows through the coil 86 of the flux generator 84. Embedded within the bridge 38 which the coil 86 surrounds is a ferromagnetic core 88 which extends substantially the full length of the bridge 38, so the coil 86 induces a magnetic flux within the core 88. That flux causes the core 88 to transform into a magnet with opposite poles at its ends. Indeed, the polarity of the poles reverses with each cycle of the alternating current impressed across the coil 86. The coil 86 and its core 88 produce an alternating magnetic flux, which passes into the cone 2 through its raceway 12.

Another form of the flux generator 84 likewise has a coil 86 and core 88, which are essentially the same as previously described. However, the coil 86 is subjected to direct current, and as a consequence, the polarity of the core 88 does not change. The coil 86 derives its electrical energy from the power receiving coil 52 on the cage 8, but the cage 8 also has a rectifier for converting the alternating current induced in the coil 52 to direct current.

In still another form the flux generator 84 constitutes nothing more than a permanent bar magnet attached to or embedded in the bridge 38 of the cage 8.

It resembles the core 88 only it is permanently magnetized.

In addition to the flux generators 84, the sensing unit D for monitoring torque includes magnetic flux detectors 90 which are attached to the remaining bridges 38 of the cage 8. Thus, alternating bridges 38 carry flux detectors 90.

Each flux detector 90 is located on the inside face of the bridge 38 to which it attached and is presented close to the raceway 12 of the cone 2. The flux detectors 90 are capable of detecting variations in flux at the raceway 12.

Each detector 90 lies symmetrically between two flux generators 84 and is differentially connected to the detectors 90 at the other two flux generators 84 between which it lies. In a sense, the detectors 90 are organized in pairs, with each pair being separated by a flux generator 84. Actually, each detector 90 forms one of two pairs in that it forms a pair with the detector 90 to one side of it and forms another pair with the detector on the other side of it. By reason of the differential connection between the detector 90 of a pair, the symmetrical flux patterns which exist when no torque is transferred has the effect of nulling out the combined output of each pair of detectors. Electric fine-tuning at the processor 56 can enhance the nulling.

Figures 10A, 10B:
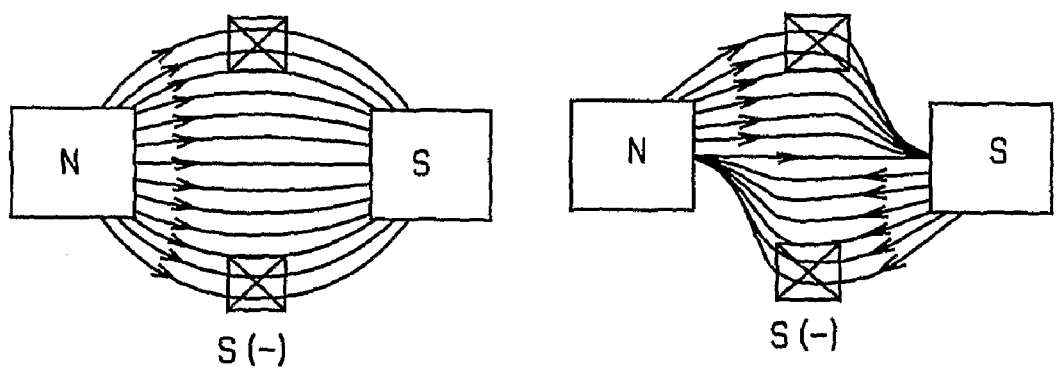
FIG. 10A is a schematic view showing the distribution of magnetic flux in the absence of torsional stresses.
FIG. 10B is a schematic view showing the distribution of magnetic flux in the presence of torsional stresses.

However, when the shaft B transfers torque, the torque is transmitted to the cone 2 where it creates regions of compression and tension that exist at the raceway 12. These regions of compression distort the flux patterns (FIG. 10A) and they lose their symmetry (FIG. 10B). The signals derived from the pairs of detectors 90 no longer null out. The processor 56 sums up the magnitude of the signals and determines an average. The magnitude of the average is proportional to the torque within the cone 2. A signal representing it is routed to the transmitter 54, which broadcasts the signal through the transmitting antenna 58. The receiver 62 receives the signal through the receiving antenna 60.

The detectors 90 may take the form of air core magnetic flux detectors, ferromagnetic flux detectors, Hall-effect detectors, magnetoresistive detectors, and giant magnetoresistive detectors.

When the detectors 90 are mounted on the outside faces of the bridges 38 for the cage 8, they will detect torsional stresses in the cup 4. This, in turn, enables one to monitor torsion in the housing C, provided of course that the cup 4 is installed in the housing C with an interference fit.

Temperature Monitoring

A rise in temperature of the bearing A usually denotes a depletion of lubricant along the raceways 12 and 22 of the cone 2 and cup 4, respectively. In some instances the bearing A may operate with only minimal lubrication to avoid excessive churning of the lubricant along the raceways 12 and 22. When the bearing A is so lubricated, one should constantly monitor its temperature to determine when additional lubricant is required, and the monitoring should occur at the raceways 12 and 22 where a rise in temperature will first manifest itself. Even with less specialized lubrication, it is desirable to know the outset of a rise in temperature in the bearing A, and the raceways 12 and 22 provide the best location for making this determination.

Figure 11:
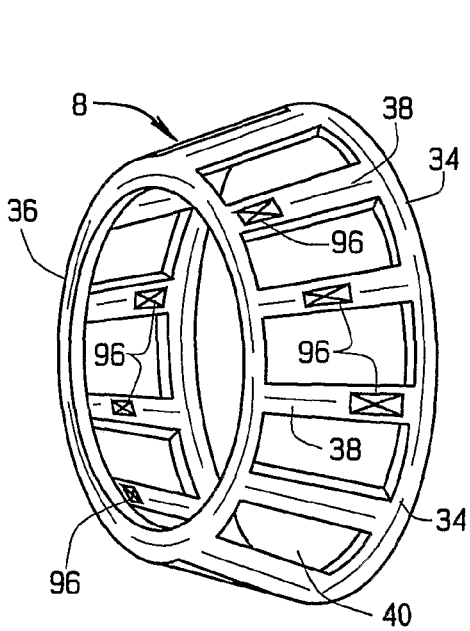
FIG. 11 is a perspective view of a cage having a sensing unit designed to monitor the temperature of the raceways.
Figure 12:
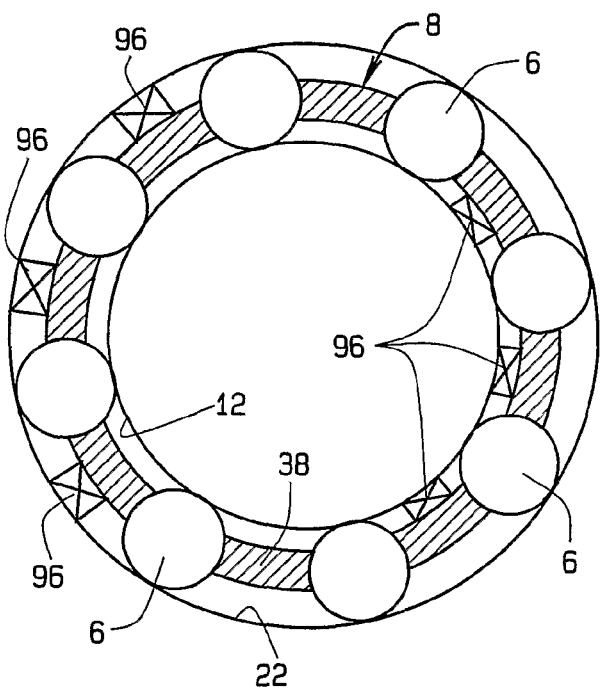
FIG. 12 is a transverse sectional view of a bearing fitted with the cage of FIG. 11.

With reference now to FIGS. 11 and 12, the sensing unit D includes temperature sensors 96 that are used to monitor the temperature at the raceways 12 and 22 for the cone 2 and cup 4, respectively. The temperature sensors 96 are attached to the cage 8 along the bridges 38. The sensors 96, which are employed to monitor the temperature of the cone raceway 12, lie along the inside faces of the bridges 38 where they are presented toward the cone raceway 12. The sensors 96 that are used to monitor the temperature of the cup raceway 22 lie along the outside faces of the bridges 38 where they are presented toward the cup raceway 22. Preferably, each bridge 38 carries only one temperature sensor 96. Moreover, the sensors 96 for the cone raceway 12 are staggered axially to ascertain the temperature at different tracks along the cone raceway 12, and the same holds true with regard to the sensors 96 which monitor the cup raceway 22. The outputs for each group of sensors 96 that face the cone raceway 12 are averaged electronically at the processor 56 to provide the average temperature for the cone raceway 12 and the same holds true for the sensors 96 for the cup raceway 22. The transmitter 54 sends signals reflecting the two average temperatures to the receiver 62, which in turn routes them to the processor 64 for further processing.

Speed Monitoring

In machinery it is important to monitor the speed at which the shaft B rotates within the housing C or the speed at which the housing C rotates around the shaft B. Tachometers are used to monitor the speed of the shaft B or the housing C. The speed of the shaft B or the housing C is proportional to the speed at which the cage 8 rotates between the cone 2 and cup 4. After all, when relative rotation occurs between the cone 2 and cup 4, the rollers 6 roll along the raceways 12 and 22 and carry the cage 8 along with it, inasmuch as the cage 8 interlocks at its pockets 40 with the complement of rollers 6.

Figure 13:
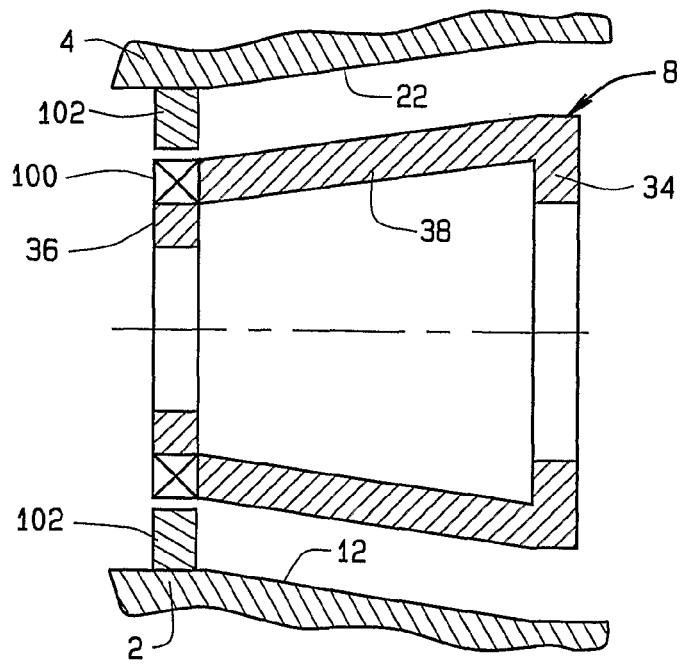
FIG. 13 is a longitudinal sectional view of a cage having a sensing unit designed to monitor the angular velocity of the bearing.

To monitor the speed, that is the angular velocity of either the cone 2 or the cup 4, whichever rotates, the sensing unit D, as illustrated in FIG. 13, includes a speed sensor 100 that is carried on one of the bridges 38 of the cage 8 near its small end ring 36. The cone 2 or cup 4, on the other hand, is fitted with a target wheel 102, which has discontinuities of one type or another. For example, the discontinuities may take the form of teeth or apertures or alternating magnetic poles. In any event, the sensor 100 has the capacity to produce a signal that in essence constitutes an electrical pulse for each discontinuity. These pulses are provided to the transmitter 54, which sends the pulses to the receiver 62. These signals are then routed to the processor 64, which converts the pulses to a reading reflective or indicative of angular velocity.

The speed sensor 100 may take the form of a variable reluctance sensor, an eddy current sensor; a Hall-effect sensor; a magnetoresistive sensor or a giant magnetoresistive sensor.

It will be appreciated that aspects of the embodiments of the present invention may be combined in various combinations to generate other alternative embodiments while staying within the scope of the present invention.

From all that has been said, it will be clear that there has thus been shown and described herein a bearing with cage mounted sensors which fulfills the various objects and advantages sought therefore. It will become apparent to those skilled in the art, however, that many changes, modifications, variations, and other uses and applications of the subject bearing with cage mounted sensors are possible and contemplated. All changes, modifications, variations, and other uses and applications which do not depart from the spirit and scope of the invention are deemed to be covered by the invention, which is limited only by the claims which follow.

The invention claimed is:

1. An antifriction bearing for accommodating rotation about an axis comprising:
    an inner race having a raceway presented away from the axis,
    an outer race having a raceway presented inwardly toward the axis and toward the raceway of the inner race, the outer race having a power transmitting coil and an antenna,
    rolling elements positioned between the inner and outer races and contacting the raceways of those races so that when relative rotation occurs between the races the rolling elements roll along the raceways, and
    a cage positioned between the inner and outer races and having pockets in which the rolling elements are received with the cage being rotatable between the races as the rolling elements roll along the raceways, a power receiving coil positioned relative to the power transmitting coil of the outer race for receiving power therefrom, a sensing unit for sensing a condition of the bearing, and a transmitter coupled to the sensing unit for receiving the sensed condition and having an antenna coupled to the transmitter for sending a signal indicative of the received sensed condition of the bearing to the antenna of the outer race, each of the sensing unit and the transmitter being coupled to the power receiving coil for receiving a portion of the received power.

2. The antifriction bearing of claim 1 wherein the sensing unit comprises a coil positioned on the cage for sensing a load on one of the rolling elements.

3. The antifriction bearing of claim 2 wherein coil is configured for detecting the presence of eddy currents in one of the rolling elements and producing an output signal indicative of stress on the rolling element responsive to the detected eddy currents, wherein the signal sent by the transmitter is responsive to the output signal of the coil.

4. The antifriction bearing of claim 1 wherein the sensing unit comprises a coil positioned around each of the pockets and on the cage, each coil for sensing a load on each of the rolling elements.

5. The antifriction bearing of claim 1 wherein the sensing unit comprises probes positioned on the cage around each of the pockets with the probes for sensing a load on each of the rolling elements.

6. The antifriction bearing of claim 1 wherein the sensing unit includes a magnetic flux generator configured for generating magnetic flux and a magnetic flux detector configured for sensing torsional stresses in one of the races.

7. The antifriction bearing of claim 6 wherein the magnetic flux generator comprises a coil and a ferromagnetic core.

8. The antifriction bearing of claim 1 wherein the cage comprises bridges between the rolling elements and the sensing unit comprises a magnetic flux generator positioned on alternate bridges and a magnetic flux detector positioned on the other bridges.

9. The antifriction bearing of claim 8 wherein the magnetic flux detectors are differentially connected together for sensing torsional stresses in one of the races.

10. The antifriction bearing of claim 1 wherein the sensing unit comprises a temperature sensor for sensing the temperature of one of the races.

11. The antifriction bearing of claim 1 wherein the cage comprises bridges between the rolling elements and the sensing unit comprises a temperature sensor mounted to each of the bridges for sensing the temperature of one of the races.

12. The antifriction bearing of claim 11 wherein each of the temperature sensors are staggered axially with respect to each other to sense different regions of the race being sensed.

13. The antifriction bearing of claim 1 further comprising a position reference having a discontinuity attached to at least one of the races and wherein the sensing unit includes a speed sensor mounted on the cage with the speed sensor configured for sensing the speed of the cage relative to the position reference.

14. The antifriction bearing of claim 1 wherein said power receiving coil is aligned with the power transmitting coil, and said antenna of the cage is aligned with the antenna of the outer race.

15. The antifriction bearing of claim 1 wherein the transmitter is capable of transmitting a radio frequency signal and the antenna of the outer race is capable of receiving the radio frequency signal.

16. The antifriction bearing of claim 1 wherein the sensing unit is configured for sensing an operating condition selected from the group consisting of a load through one of the rolling elements, a torsional stress at one of the races, a temperature of one of the races, and an angular velocity of one of the races.

17. The antifriction bearing of claim 1 wherein the cage includes a rectifier coupled to the power receiving coil for generating DC power on the cage and wherein the sensing unit and the transmitter are each coupled to the rectifier for receiving a portion of the generated DC power, wherein the sensing unit of the cage includes one or more sensors for detecting an operating characteristic of the bearing and a processor coupled to the one or more sensors for receiving the operating characteristic as detected, configured for determining the condition of the bearing responsive to the received operating characteristics, and coupled to the transmitter for providing the condition to the transmitter for sending by the transmitter.

18. The antifriction bearing of claim 17 wherein the sensing unit includes an excitation source configured for inducing electromagnetic flux and wherein the sensing unit is configured for receiving variations in the induced electromagnetic flux in sensing the condition.

19. An antifriction bearing assembly for accommodating rotation about an axis, including an inner race having a raceway presented away from the axis, an outer race having a raceway presented inwardly toward the axis and toward the raceway of the inner race, and rolling elements positioned between the inner and outer races and contacting the raceways of those races so that when relative rotation occurs between the races the rolling elements roll along the raceways, the assembly comprising:
    a cage positioned between the inner and outer races and having pockets in which the rolling elements are received, the cage being rotatable between the races as the rolling elements roll along the raceways, a power receiving coil configured for receiving power, a rectifier coupled to the power receiving coil for receiving at least a portion of the received power and for generating DC power from the received power, a sensing unit having one or more sensors for sensing an operating characteristic of the bearing assembly, a processor coupled to the sensing unit for receiving and processing the operating characteristics to determine the sensed condition, and a transmitter having an antenna for sending a signal indicative of the sensed condition, the transmitter being coupled to the processor for receiving the sensed condition, the sensing unit, the processor and the transmitter are each coupled to the rectifier for receiving at least a portion of the generated DC power;

a power transmitting coil positioned circumferentially about an end of the cage for transmitting power to the power receiving coil of the cage; and an antenna positioned circumferentially about an end of the cage and configured for receiving the signal sent by the transmitter.

20. The antifriction bearing assembly of claim 19 wherein the sensing unit is configured for sensing an operating condition selected from the group consisting of a load through one of the rolling elements, a torsional stress at one of the races, a temperature of one of the races, and an angular velocity of one of the races.

21. An antifriction bearing assembly for accommodating rotation about an axis, including an inner race having a raceway presented away from the axis, an outer race having a raceway presented inwardly toward the axis and toward the raceway of the inner race, and rolling elements positioned between the inner and outer races and contacting the raceways of those races so that when relative rotation occurs between the races the rolling elements roll along the raceways, the assembly comprising:

a cage positioned between the inner and outer races and having pockets in which the rolling elements are received, the cage being rotatable between the races as the rolling elements roll along the raceways, a power receiving coil configured for receiving power, a load sensing unit configured for sensing a load through at least one of the rolling elements, and a transmitter having an antenna for sending a signal indicative of the sensed load, the transmitter coupled to the load sensing unit for receiving the sensed load, wherein each of the load sensing unit and the transmitter are coupled to the power receiving coil for receiving at least a portion of the received power;

a power transmitting coil positioned circumferentially about an end of the cage for transmitting power to the power receiving coil of the cage; and an antenna positioned circumferentially about an end of the cage and configured for receiving the signal sent by the transmitter.

22. An antifriction bearing assembly for accommodating rotation about an axis, including an inner race having a raceway presented away from the axis, an outer race having a raceway presented inwardly toward the axis and toward the raceway of the inner race, and rolling elements positioned between the inner and outer races and contacting the raceways of those races so that when relative rotation occurs between the races the rolling elements roll along the raceways, the assembly comprising:

a cage positioned between the inner and outer races and having pockets in which the rolling elements are received, the cage being rotatable between the races as the rolling elements roll along the raceways, a power receiving coil configured for receiving power, a torque sensing unit configured for sensing torsional stress in one of the races and coupled to the power receiving coil for receiving a first portion of the received power, and a transmitter having an antenna for sending a signal indicative of the sensed torsional stress, the transmitter being coupled to the torque sensing unit for receiving the sensed torsional stress and coupled to the power receiving coil for receiving a second portion of the received power;

a power transmitting coil positioned circumferentially about an end of the cage for transmitting power to the power receiving coil of the cage; and an antenna positioned circumferentially about an end of the cage and configured for receiving the signal sent by the transmitter.

23. An antifriction bearing assembly for accommodating rotation about an axis comprising:

an inner race having a raceway presented away from the axis:

an outer race having a raceway presented inwardly toward the axis and toward the raceway of the inner race:

an end ring having a power transmitting coil and an antenna positioned radially from the power transmitting coil:

rolling elements positioned between the inner and outer races and contacting the raceways of those races so that when relative rotation occurs between the races the rolling elements roll along the raceways: and a cage positioned between the inner and outer races and having pockets in which the rolling elements are received with the cage being rotatable between the races as the rolling elements roll along the raceways, a power receiving coil positioned about an end of the cage and opposite the power transmitting coil of the end ring for receiving power from the power transmitting coil, a sensing unit for sensing a condition of the bearing, and a transmitter including an antenna positioned about an end of the cage and opposite the antenna of the end ring, the transmitter coupled to the sensing unit receiving the sensed condition from the sensing unit and sending a signal indicative of the sensed condition of the bearing to the antenna of the end ring, wherein each of the sensing unit and the transmitter are coupled to the power receiving coil for receiving at least a portion of the received power.

24. The antifriction bearing of claim 23 wherein the sensing unit includes one or more sensors and a processor coupled to the one or more sensors for receiving and processing sensor signals and coupled to the transmitter for providing the signal indicative of the sensed condition of the bearing.

25. The antifriction bearing of claim 23 wherein the sensing unit is configured for sensing an operating condition selected from the group consisting of a load through one of the rolling elements, a torsional stress at one of the races, a temperature of one of the races, and an angular velocity of one of the races.

* * * * *